(12) United States Patent
Bricklin et al.

(10) Patent No.: US 11,341,437 B1
(45) Date of Patent: *May 24, 2022

(54) VOICE ENABLED ASSISTANT FOR COMMUNITY DEMAND FULFILLMENT

(71) Applicant: Wells Fargo Bank, N.A., San Francisco, CA (US)

(72) Inventors: Nathan Craig Bricklin, Walnut Creek, CA (US); Wairnola Marria Rhodriquez, San Francisco, CA (US); Kathleen E. McGinn, Mill Valley, CA (US); Ryan Benjamin Miller, Petaluma, CA (US); Adnan Khan, San Francisco, CA (US); Gregory John Hansen, El Dorado Hills, CA (US); Chris Theodore Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,166

(22) Filed: Jun. 8, 2020

Related U.S. Application Data

(63) Continuation of application No. 15/820,544, filed on Nov. 22, 2017, now Pat. No. 10,679,156.

(51) Int. Cl.
*G06Q 10/00* (2012.01)
*G06Q 10/06* (2012.01)
*G10L 15/18* (2013.01)
*G06F 16/68* (2019.01)
(Continued)

(52) U.S. Cl.
CPC ..... *G06Q 10/063112* (2013.01); *G06F 3/167* (2013.01); *G06F 16/686* (2019.01); *G10L 15/18* (2013.01); *G06Q 50/01* (2013.01)

(58) Field of Classification Search
None
See application file for complete search history.

(56) References Cited

U.S. PATENT DOCUMENTS

| 7,444,315 B2 | 10/2008 | Wu |
| 8,018,462 B2 | 9/2011 | Bhogal et al. |
| 9,172,747 B2 | 10/2015 | Walters |

(Continued)

OTHER PUBLICATIONS

Raisinghani, Manisha, Voice-controlled automation of logistics is now possible, Feb. 7, 2018, IoT Agenda, https://internetofthingsagenda.techtarget.com/blog/IoT-Agenda/Voice-controlled-automation-of-logistics-is-now-possible, p. 1-4. (Year: 2018).*

(Continued)

*Primary Examiner* — Joseph M Waesco
(74) *Attorney, Agent, or Firm* — Schwegman Lundberg & Woessner, P.A.

(57) ABSTRACT

Systems and techniques for voice enabled assistant for community demand fulfillment are described herein. A community of user devices may be identified that are registered with a voice-based supply and demand matching service. A supply of an item may be determined based on first user audio collected from a first user device of the community of user devices. A demand for the item may be determined based on second user audio collected from a second user device of the community of user devices. An indication of the supply may be transmitted to a user of the second user device.

20 Claims, 4 Drawing Sheets

(51) Int. Cl.
*G06F 3/16* (2006.01)
*G06Q 50/00* (2012.01)

(56) References Cited

U.S. PATENT DOCUMENTS

| | | | |
|---|---|---|---|
| 9,571,645 B2 | 2/2017 | Quast et al. | |
| 9,990,175 B2* | 6/2018 | Zhang | H05B 47/10 |
| 10,679,156 B1* | 6/2020 | Bricklin | G06F 16/903 |
| 2001/0037283 A1 | 11/2001 | Mullaney | |
| 2005/0060245 A1* | 3/2005 | Hoffman | G06Q 30/04 |
| | | | 705/28 |
| 2005/0261935 A1* | 11/2005 | Silverbrook | H04L 9/3247 |
| | | | 705/2 |
| 2008/0243828 A1* | 10/2008 | Reztlaff | G06F 16/319 |
| 2008/0293450 A1* | 11/2008 | Ryan | H04L 67/12 |
| | | | 455/556.2 |
| 2008/0294674 A1* | 11/2008 | Reztlaff, II | G06Q 30/00 |
| 2009/0313090 A1* | 12/2009 | Armstrong | G06Q 10/0637 |
| | | | 705/7.36 |
| 2010/0010875 A1* | 1/2010 | Armstrong | G06Q 10/06375 |
| | | | 705/7.37 |
| 2011/0215145 A1* | 9/2011 | Silverbrook | G07D 7/004 |
| | | | 235/380 |
| 2012/0086549 A1* | 4/2012 | Barnes, Jr. | H04W 4/02 |
| | | | 340/5.61 |
| 2012/0089470 A1* | 4/2012 | Barnes, Jr. | G06Q 30/06 |
| | | | 705/16 |
| 2012/0095844 A1* | 4/2012 | Barnes, Jr. | G06Q 20/3224 |
| | | | 705/14.69 |
| 2012/0209705 A1* | 8/2012 | Ramer | G06Q 30/02 |
| | | | 705/14.51 |
| 2012/0209707 A1* | 8/2012 | Ramer | G06F 16/9535 |
| | | | 705/14.51 |
| 2012/0209708 A1* | 8/2012 | Ramer | G06Q 30/0273 |
| | | | 705/14.51 |
| 2012/0215640 A1* | 8/2012 | Ramer | G06F 16/9535 |
| | | | 705/14.55 |
| 2013/0211870 A1* | 8/2013 | Lawson | H04L 67/2804 |
| | | | 705/7.25 |
| 2014/0047001 A1 | 2/2014 | Phillips et al. | |
| 2014/0094965 A1* | 4/2014 | Silverbrook | G06Q 10/087 |
| | | | 700/237 |
| 2014/0164476 A1 | 6/2014 | Thomson | |
| 2015/0066817 A1 | 3/2015 | Slayton et al. | |
| 2015/0185996 A1 | 7/2015 | Brown et al. | |
| 2015/0234636 A1* | 8/2015 | Barnes, Jr. | G06Q 20/322 |
| | | | 715/728 |
| 2016/0070581 A1 | 3/2016 | Soon-shiong | |
| 2016/0371854 A1* | 12/2016 | Gershon | G06Q 30/0639 |
| 2017/0232300 A1* | 8/2017 | Tran | A61B 5/11 |
| | | | 434/247 |
| 2018/0137455 A1* | 5/2018 | Mack | G06Q 10/04 |
| 2018/0158020 A1* | 6/2018 | Khasis | G01C 21/3453 |
| 2018/0285465 A1* | 10/2018 | Schaffernoth | G06F 16/29 |

OTHER PUBLICATIONS

"U.S. Appl. No. 15/820,544, Examiner Interview Summary dated Dec. 9, 2019".
"U.S. Appl. No. 15/820,544, Non Final Office Action dated Aug. 5, 2019".
"U.S. Appl. No. 15/820,544, Notice of Allowance dated Feb. 4, 2020".
"U.S. Appl. No. 15/820,544, Response filed Jan. 6, 2020 to Non Final Office Action dated Aug. 5, 2019", 13 pgs.
Kao, O., et al., "Multimedia services for location-aware, Ad-hoc collaboration in wireless networks", Proceedings of the International Conference on Wireless Networks, ICWN'04, v 2, p. 549-555, 2004, 7 pgs.
U.S. Appl. No. 15/820,544 U.S. Pat. No. 10,679,156, filed Nov. 22, 2017, Voice Enabled Assistant for Community Demand Fulfillment.

* cited by examiner

VOICE ENABLED ASSISTANT FOR COMMUNITY DEMAND FULFILLMENT

CROSS-REFERENCE TO RELATED APPLICATION

This application is a continuation of U.S. patent application Ser. No. 15/820,544, filed Nov. 22, 2017, now issued as U.S. Pat. No. 10,679,156, which is incorporated by reference herein in its entirety.

TECHNICAL FIELD

Embodiments described herein generally relate to voice enabled assistants and, in some embodiments, more specifically to voice enabled assistants for matching supply and demand in a community.

BACKGROUND

Voice enabled assistants may use voice recognition and voice generation techniques to interact with humans using natural language. A voice enabled assistant may provide assistance to a human by managing calendar entries, retrieving information, etc. Individuals in a community may wish to share items such as products or skills amongst the community members. Sharing resources may reduce excess inventory in the community.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
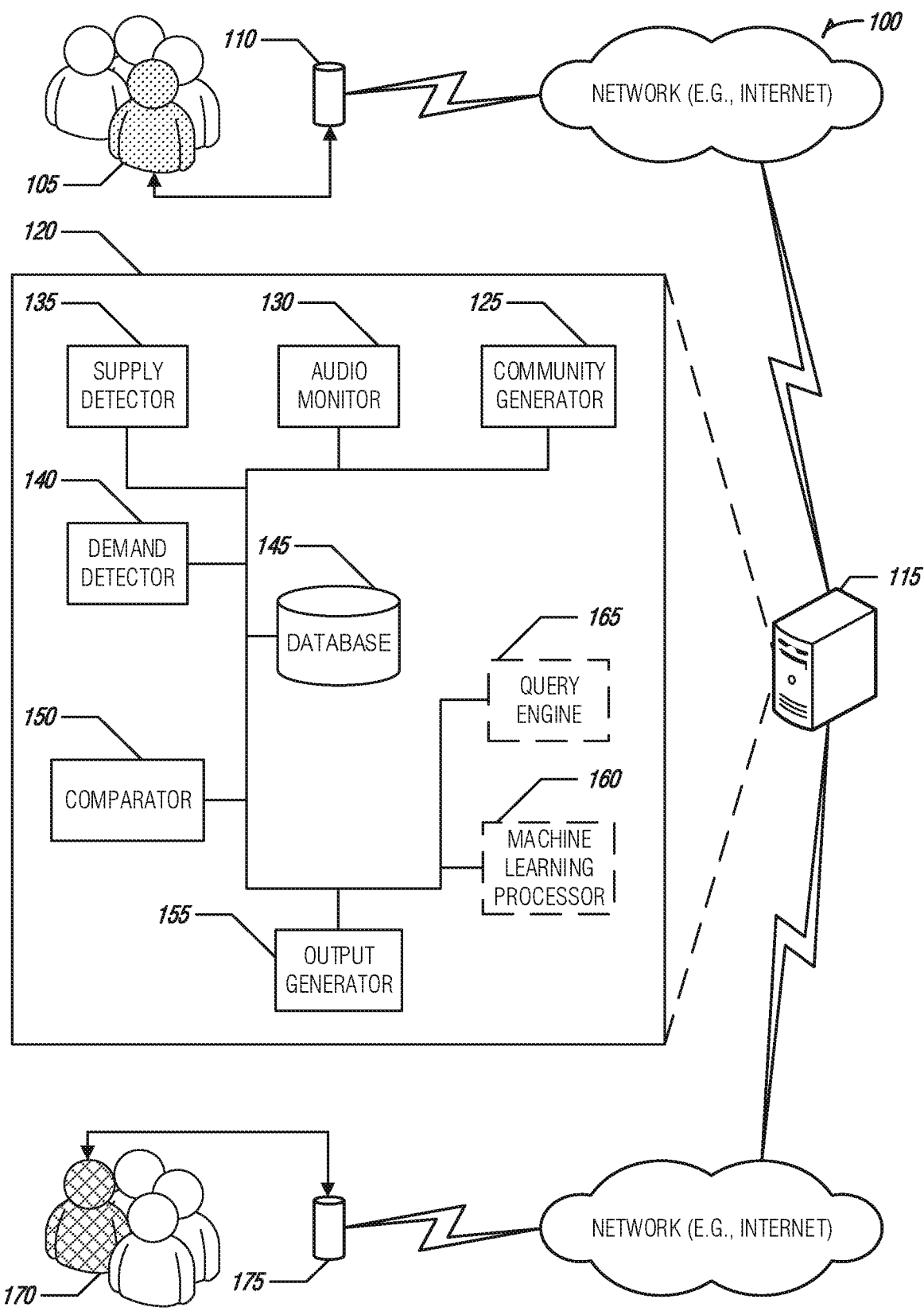
FIG. 1 is a block diagram of an example of an environment and a system for voice enabled assistant for community demand fulfillment, according to an embodiment.

Within a typical community, there may be many individuals who have needs for products and services while there may be others in the community able to provide those products and services from their own pre-existing supply or skillset. Unless a community member personally requests products and services directly (e.g., using an online forum, etc.), another member of the community may not be aware that the community member has a need that could be fulfilled by the other member of the community. Thus, within the community, there may be waste and over purchasing. For example, a community of ten homes may only need one tall ladder. However, many of the ten homes may each have a ladder that may have been purchased for a one-time need rather than finding a ladder shared amongst the community.

The present subject matter provides a solution to resource maximization within a community through use of an audio monitoring interface and observed factors (e.g., transaction records, sensors etc.) to determine supply and demand within the community. The audio monitoring interface may leverage pre-existing audio monitoring interfaces in the home (e.g., voice-enabled personal assistants, etc.) within a community and may employ a variety of voice recognition and natural language processing techniques to identify and classify audio elements received. A user may opt-in by providing permission to have the audio collected and analyzed for the purpose of identifying supply and demand and facilitating and exchange of products and services. For example, a home owner association may create a community and home owners may be allowed to opt-in to the community (e.g., their neighborhood, etc.). Each homeowner may be provided with an audio unit (or several units depending on their home size) or the homeowner may be able to connect preexisting personal audio assistants to the community.

The audio monitoring interface may work in conjunction with a supply detector to identify a supply of a product or service that may be provided by a member of the community. For example, a supply for a bike may be detected based on a community member mentioning "I love my bike" indicating an item in their possession. In another example, a supply for a service that a community member may perform may be detected based on a detected utterance of "I wonder who else might need piano lessons" from an audio monitor assigned to the community member.

In an example, data corresponding with a member (e.g., profile data, metadata, transaction records, etc.) may be analyzed to determine available supply. For example, a transaction record corresponding to a community member may indicate the member bought a 50 lb. bag of Onions. In another example, a user profile of a community member may indicate the member is a gardener and it may be determined that the member may supply gardening services. The supply may be stored in a database or other computer-readable storage medium for later use in matching supplies to demands. In an example, additional data such as expirations dates, suggested replacement dates, etc. may be stored with the supply records. The additional data may be used to provide suggestions to the community member with the supply regarding best practices (e.g., recommended replacement schedule, maintenance schedule, stock replenishment, etc.) for a supply item.

The audio interface may work in conjunction with a demand detector to identify a demand within the community. The demand may be formal (e.g., the community member specifically asks for something, etc.) or informal (e.g., the context of the words spoken by the community member indicates a need, etc.). For example, a community member say "Where can I get German lessons?" which may be detected as a demand for German lessons or the user may say "I need another two cups of sugar" while reading or preparing a recipe which may be detected a demand for two cups of sugar.

The demand may be matched to a supply and the community member with the demand may be notified of the available supply (e.g., via voice output from the audio unit or voice-enabled personal assistant, text, email, display output, etc.). Privacy may be maintained between individuals of the community by only revealing the supply/demand match to the two or more parties involved.

The the supply inventory of products and services which are owned by the community (e.g., as strode in the database, etc.) may be analyzed upon the detection of a demand to connect a community member with a need to one or more community members with a supply that may meet the demand. For example, a community member, "Juan," may utter "The lawn needs to be cut" which may be interpreted by the audio interface and the demand detector as "Juan needs gardening or mowing services." A comparator may be employed to analyze the community supply to determine another community member, "Sophie," is a gardener that is able to provide the gardening or mowing service for Juan. An output may be generated to a device corresponding with the community member for whom a demand has been detected. For example, spoken word output may be generated and transmitted to a voice-enabled personal assistant device registered to Juan that utters "There is a gardener around the corner."

The community member may be able to provide feedback verifying the demand and requesting details for the supply. For example, Juan may utter "Cool. Who is it?" In response, information regarding the supply may be generated and output to the community member with the demand. For example, voice output may utter "Sophie, at 1567 Hollowgate Way." A connection between the community member with the demand and the community member with the supply may be facilitated upon the request of the community member with the demand. For example, Juan may say "Great, connect me with her" and a calendar and location data authorized for access by Sophie may be evaluated to determine when Sophie is available. Sophie may be currently unavailable, but may be available in two hours. Calendar data authorized for access by Juan may be evaluated to find an overlapping free period for Sophie and Juan in two hours.

Output may be generated and transmitted indicating the availability of the supply. For example, the voice-enabled personal assistant may say "Juan, Sophie is not available right now, but I can ask her to come by in a few hours. You OK with that?" The community member may then provide verification. For example, Juan may say "Sounds good." A meeting note may be placed in the respective calendars of Sophie and Juan so that each community member is aware that a match has been facilitated. In some cases, the supply community member may be available and immediate communication may be facilitated (e.g., through their respective audio interfaces, etc.).

In an example, a demand may be detected to which a supply may not be found within the inventory of the community. The comparator may work in conjunction with the output generator to identify a source of supply to meet the demand. For example, a supply of a product may be identified at a retailer website and the community member may be provided with an indication (e.g., verbally, visually, etc.) of the website having a supply to meet the demand. In another example, a supply may be identified in the inventory of another community and the community member may be prompted to join the other community to be matched with the supply. The other community may be identified based on proximity to the present community, a special interest relating to the demand (e.g., classic cars, motorcycles, games, etc.).

In an example, demands of community members may be tracked to identify usage trends for the community and its members. For example, a community member may frequently have a demand for a ladder and, based on the frequency of use, a suggestion may be presented to the community member that a ladder should be purchased based on demand frequency.

FIG. 1 is a block diagram of an example of an environment 100 and a system 120 for voice enabled assistant for community demand fulfillment, according to an embodiment. The environment 100 may include a first community member 105 with a corresponding first device 110 (e.g., voice-enabled personal assistant, audio device, etc.) connected to (e.g., via the Internet, local network, wide area network, wired network, wireless networks, etc.) a computing device 115 (e.g., a server, cloud computing platform, a cluster of computers, etc.) hosting the system 120. The environment 100 may include a second community member 170 with a corresponding second device 175 that is connected to the computing device 115.

The system 120 may include a variety of components including a community generator 125, an audio monitor 130, a supply detector 135, a demand detector 140, a database 145, a comparator 150, an output generator 155, a machine learning processor 160, and a query engine 165.

The community generator 125 may identify a community of user devices, such as the first device 110 and the second device 175, registered with the system 120. In an example, the community may be based on proximity of the respective devices (e.g., a geographic area, etc.). In another example, the community may be based on a shared interest of users of the user devices (e.g., an interest in model trains, etc.). In yet another example, the community may be based on an attribute of a user profile of respective users of the respective user devices (e.g., an occupations, etc.).

The community generator 125 may identify the devices based on the devices being registered with a community previously generated by the community generator 125. The community generator 125 may provide a community generation graphical user interface that provides a user (e.g., a community manager, etc.) with a set of user interface tools (e.g., buttons, text boxes, other controls, etc.) for creating and managing a device community. The graphical user interface may be used to send invitations to users in the community that include the ability to register one or more devices with the system 120.

For example, a home owner association board may create a community for the members of the home owner association. Upon creation of the community, invitations may be transmitted to members of the community such as the first community member 105 and the second community member 170. The first community member 105 may register the first device 110 with the system 120 and the second community member 170 may register the second device 175 with the system 120. The registration process may include terms of use alerting the community member that audio from the device and profile data including transactional data may be continuously collected and monitored to facilitate automatic matching of supplies and demands within the community.

A user may set a variety of privacy settings indicating data that may and may not be accessed by the system 120. The user may provide trust circles based on relationships with other members of the community (e.g., connections on a social network, friends, family, etc.). The privacy controls may allow trust levels to be set based on the relationships. In an example, the community generator 125 may establish additional communities for a user based on the relationships.

Upon completion of the device registration process, the audio monitor 130 may begin monitoring audio collected from the first device 110 and the second device 175. The audio monitor 130 may include an audio surface which may record sound and, in conjunction with the output generator 155, broadcast sound. The first device 110 and the second device 175 may use a variety of voice recognition, natural language processing, and voice generation techniques to leverage a microphone and speakers of the first device 100 and the second device 175. The audio monitor 130 may capture sound from the speakers and may send the captured sound to a voice recognition unit for processing. In an example, an existing in-home unit, such as, for example, a voice-enable personal assistant may be leveraged to collect the audio.

The voice recognition unit may receive an audio stream and may detect users (e.g., a community member, etc.) based on vocal intonation and other voice identification factors. In an example, a device may be registered to more than one community member (e.g., multiple member households, etc.) and the audio monitor may use voice identification techniques to identify the current community member that is using the device. The voice recognition unit may then convert the audio stream to text and track the community member that created the audio stream.

The database 145 may be a database or other computer readable medium capable of storing electronic data. The database 145 may include a comprehensive inventory of both the products that community members own and any services community members may provide for other community members. The database 145 may be revised as new items are purchased by the community members, new skills are learned by community members, new members move into the community, members leave the community, etc.

The audio monitor 130 may work in conjunction with the supply detector 135 to determine a supply of an item based on first user audio collected from the first device 110. The supply detector 135 may receive a stream of text from the audio monitor 130 and may parse the text for supply messages (e.g., statements of purchase, statements of ownership, statements of skills, etc.). The supply detector 135 may include application program interface (API) connectors and other system integration and data access techniques to access pre-authorized transaction streams. Transaction data corresponding to the first community member 105 (and the second community member 170) may be captured and parsed to determine supply.

For example, the first user 105 may have purchased a 50 pound bag of onions which may be included in a transaction record and a supply of onions may be determined for the community from the first community member 105. The supply detector 135 may include connections to ecommerce or retailers systems which may be used to capture detailed product information for identified supply items. For example, features, expiration dates, life expectancy, etc. may be collected and stored for the items of supply (e.g., in the database 145, etc.).

The product information may be used by a usage graph service of the supply detector 135 to track consumable items. The usage graph may include detailed information for supply items and their typical usage lifespan, demand usage, repurchase frequency, common usage patterns, best-before dates, and other factors. Alternatively or additionally, the usage graph service may track longer lifespan items and their typical usage rates. In an example, on-board sensors may be placed on long-life items to determine the lifespan of the item based on sensor data. For example, the current remaining lifespan of a power drill may be determined based on usage and life expectancy of the motor of the drill.

The audio monitor 130 may work in conjunction with the demand detector 140 to determine a demand for the item based on second user audio collected from the second device 175 of the second community member 175. For example, the second community member may say "I need an onion for this recipe" and the audio stream including the utterance may be processed by the voice recognition unit to convert the audio to text. The text may be parsed to identify a demand for an item. The demand may be identified based on a request located in the text. For example, the text "I need an onion for this recipe" may be determined to be a demand from the second community member 170 for an onion.

The comparator 150 may generate and perform a query in conjunction with the query engine 165 to determine if a supply is available in the community to meet (e.g., fulfill, etc.) the determined demand. In an example, the comparator 150 may include a market creation service which may be a cloud based process which can match a captured demand request with an available supply request. If the supply is not available within the community, the comparator 150 may work in conjunction with the query engine 165 to query APIs connected to external ecommerce vendors to submit queries for product and/or service availability to meet the demand outside the community. In addition to availability, the query may return pricing, inventory, availability dates, etc. In an example, the comparator 150 may calculate that the supply is insufficient to meet the demand and a source for a deficit supply (e.g., quantity of supply unable to be fulfilled, etc.) may be identified.

In an example, the comparator 150 may work in conjunction with the query engine 165 to generate and submit a query for supply across a variety of other communities. Links may be established between communities based on a variety of factors such as, for example, physical proximity, interests of community members, type of demand detected, etc. The query may be transmitted across the community links to identify other sources of available supply in instances when it has been determined that the local community has an insufficient supply to meet the demand. In an example, the comparator 150 may calculate that the supply is insufficient to meet the demand. The community of user devices may be expanded (e.g., by adding devices from additional communities, etc.) and an additional supply of the item may be determined based on audio collected from a user device of the expanded community.

The comparator 150 may determine that a single community member is unable to fulfill the demand, but that a collection of community members may be able to fulfill the demand. In an example, the comparator 150 may calculate that the supply is insufficient to meet the demand (e.g., solely from first community member 105, etc.) and an additional supply of the item may be determined based on audio collected from a third user device. Thus, the comparator 150 may match the demand to more than one source for fulfillment.

The comparator 150 may work in conjunction with the output generator 155 to transmit an indication of the supply to the second community member 170. The indication may be transmitted to the second device 175 or another device registered to the second community member. For example, the indication may be generated as spoken word transmitted to the second device 175, sent as a text message to a smartphone of the second community member 170, etc. In an example, a supply response may be generated for the second community member 170 and the response may be transmitted to a registered device nearest to the second community member 170 (e.g., closest in proximity based on collected sensor data, etc.).

The second community member 170 may interact with the system when a supply is found to meet the demand. The second community member 170 may confirm that the supply is acceptable by stating so and the audio monitor 130 may work in conjunction with the output generator 155 to connect the second community member 170 to the first community member 105. In an example, the output generator 155 may establish an audio connection (e.g., audio bridge, voice over internet protocol call, point-to-point audio connection, etc.) between the second device 175 and the first audio device 110 which the second community member 170 and the first community member 105 may use to arrange fulfillment of the demand. In another example, the output generator 155 may monitor a calendar of the first community member 105 and a calendar of the second community member 170 to suggest a good time for them to meet. In an example, the output generator 155 may identify an overlapping free period in the calendars and may generate a calendar entry in the respective calendars to facilitate fulfillment of the demand.

If the demand cannot be met within the community, the comparator 150 may work in conjunction with the output generator 155 to provide an indication of the external availability of supply to meet the demand. An indication may be transmitted to the second community member 170 indicating where and when a supply is available from an external source. In an example, upon approval of the second community member 170, the output generator 155 may connect and interact with local or online retailers in order to purchase and arrange for delivery of the requested product or service on behalf of the second community member 175. In an example, a connection between the second community member 170 and a member of another community may be facilitated.

The machine learning processor 160 may evaluate data (e.g., stored in the database 145, etc.) to determine usage statistics and predict supply demands for the community. For example, an increased demand for baking supplies may be determined around a particular holiday and the machine learning engine 160 may work in conjunction with the output generator to transmit indications to members of the community that an increased demand for certain supplies may be coming. In another example, demand activity for a community member, such as the second community member 170, may be evaluated to make recommendations to the user based on usage patterns, etc. For example, the machine learning processor 160 may identify a demand trend for the second community member 170 indicating a steady (e.g., several a week, etc.) demand for onions and the machine learning processor 160 may work in conjunction with the output generator 155 to transmit a suggestion to the second community member 170 the they should become a supply of onions by purchasing a large quantity of onions. In an example, consumption of the supply of the item may be tracked for the user. A usage trend may be identified using the tracked consumption and an indication may be transmitted to the user (e.g., by the output generator 155, etc.) that the user become a supplier of the item based on the usage trend.

In an example, the machine learning processor 160 may identify best practices (e.g., recommended replenishment, maintenance schedules, etc.) regarding supply in the community. The machine learning processor 160 may identify variances from the best practices (e.g., via sensors, etc.) and may work in conjunction with the output generator 155 to recommend actions to be performed to reestablish (or maintain) the best practices. The machine learning processor 160 may perform comparisons amongst community members to identify best practices and make recommendations. Additionally or alternatively, the machine learning processor 160 may compare the community members with members of other communities to identify supply best practices. The machine learning processor 160 may then work in conjunction with the output generator 155 to provide recommendations to supply holding community members to increase supply efficiency (e.g., through stock rotation, maintenance, etc.).

In an example, a leaderboard may be established and generated for output by the output generator 155 that displays top suppliers and top demanders allowing the community members more visibility regarding how community resources are utilized. In another example, the output generator 155 may create or modify a shopping list of a user based on usage data. In an example, the demand trends and user data (e.g., selected recipes, projects, calendar entries, etc.) of a user may be evaluated to make demand predications that may result in the output generator creating or modifying the shopping list or making preemptive supply suggestions for the predicted demands.

The machine learning processor 160 may work in conjunction with the audio monitor 130, the supply detector 135, and the demand detector 140 to evaluate collected audio in determining supply and demand. In an example, the audio collected from the first device 110 may be evaluated using the machine learning processor 160 to identify a supply. In another example, the audio collected from the second device 175 may be evaluated using the machine learning processor 160 to identify a demand. The machine learning processor 160 may learn by evaluating results of demand and supply identifications (and other system data) as training data to improve the overall detection accuracy of the supply detector 135 and the demand detector 140.

In an example, the machine learning processor 160 may identify that the user consumed the supply. A dataset may be collected that includes attributes of the determined supply and demand. The dataset may be labeled based on the determined supply and demand and the machine learning processor 160 may be trained using the labeled dataset. For example, the second community member 170 may have used the onions that were received as a result of the indication that the first community member 105 had onions. The data may be labeled as a successful identification of onions, demand for onions, and match between a demand for onions and supply of onions. The machine learning processor 160 may train (e.g., reinforce, weight, etc.) based on attributes used to make the determinations around the supply and demand for onions.

While the examples include monitoring audio, the first device 110 and the second device 175 may include a camera and the image data may be evaluated to identify supply and demand. For example, the image data may be used to build a household inventory for the first community member 105 based on items detected in the images from the first device 110. A demand may be determined for the second community member 170 based on items (e.g., recipe, project plans, collection of items, etc.) and action identified in the images from the second device 175.

Figure 4:
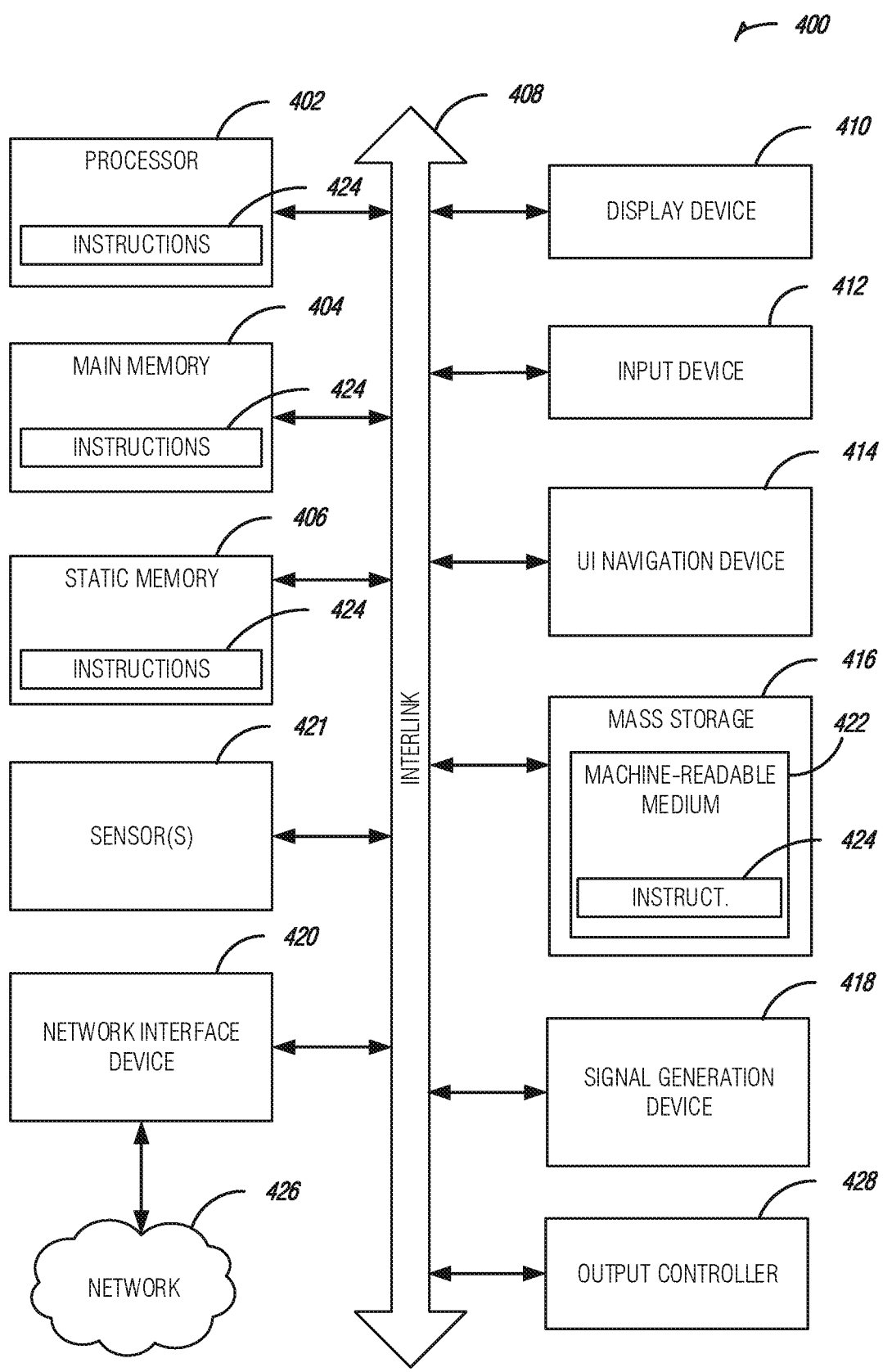
FIG. 4 is a block diagram illustrating an example of a machine upon which one or more embodiments may be implemented.

The community generator 125, the audio monitor 130, the supply detector 135, the demand detector 140, the database 145, the comparator 150, the output generator 155, the machine learning processor 160, and the query engine 165 may comprise one or more processors (e.g., hardware processor 402 described in FIG. 4, etc.) that execute software instructions, such as those used to define a software or computer program, stored in a computer-readable storage medium such as a memory device (e.g., a main memory 404 and a static memory 406 as described in FIG. 4, a Flash memory, random access memory (RAM), or any other type of volatile or non-volatile memory that stores instructions), or a storage device (e.g., a disk drive, or an optical drive). The components may be implemented in one or more computing devices (e.g., a single computer, multiple computers, a cloud computing platform, a virtual computing platform, etc.). Alternatively, the community generator 125, the audio monitor 130, the supply detector 135, the demand detector 140, the database 145, the comparator 150, the output generator 155, the machine learning processor 160, and the query engine 165 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 2:
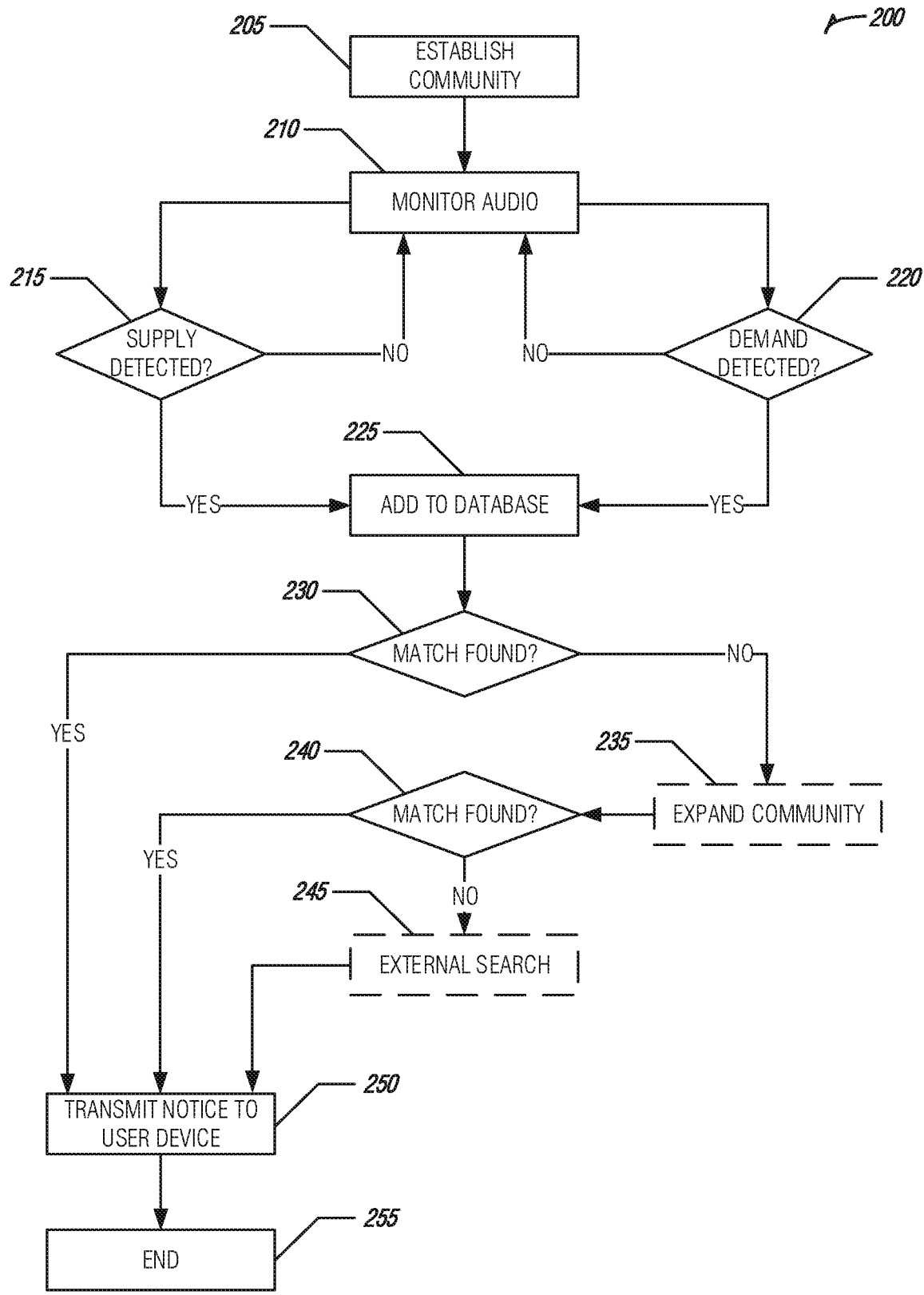
FIG. 2 illustrates a flow diagram of an example of a process for voice enabled assistant for community demand fulfillment, according to an embodiment.

FIG. 2 illustrates a flow diagram of an example of a process 200 for voice enabled assistant for community demand fulfillment, according to an embodiment. FIG. 2 may provide features as described in FIG. 1.

A community may be established (e.g., by the community generator 125 as described in FIG. 1) for a variety of user devices including a microphone and speaker (e.g., at operation 205). The user devices may be monitored (e.g., by the audio monitor 130 as described in FIG. 1) to identify supplies and demands (e.g., at operation 210).

If a supply is detected (e.g., by the supply detector 135 as described in FIG. 1) in the audio stream (e.g., at decision 215) it may be added to a database (e.g., database 145 as described in FIG. 1) for additional processing (e.g. at operation 225). If a supply is not detected in the audio stream (e.g., at decision 215), the audio may continue to be monitored (e.g., at operation 210) until a supply is detected.

If a demand is detected (e.g., by the demand detector 140 as described in FIG. 1) in the audio stream (e.g., at decision 220) it may be added to a database (e.g., database 145 as described in FIG. 1) for additional processing (e.g. at operation 225). If a demand is not detected in the audio stream (e.g., at decision 220), the audio may continue to be monitored (e.g., at operation 210) until a demand is detected.

The databased may be evaluated (e.g., by the comparator 150 as described in FIG. 1) to determine whether a match exists between a supply in the database and a detected demand (e.g., at decision 230). If a match is found (e.g., at decision 230), a notice may be transmitted to the user device from which the demand was detected (e.g., at operation 250) indicating the source of the supply. The process then ends for that demand (e.g., at end 255).

If a matching supply is not found for the demand (e.g., at decision 230), the community may be expanded (e.g., at operation 235). Supply data may be reevaluated to determine if a matching supply has been found in the expanded community (e.g., at decision 240). If a match is found (e.g., at decision 230), a notice may be transmitted to the user device from which the demand was detected (e.g., at operation 250) indicating the source of the supply. The process then ends for that demand (e.g., at end 255).

If a matching supply is not found for the demand (e.g., at decision 240), a query may be generated and submitted (e.g., by the query engine 165 as described in FIG. 1) to external suppliers (e.g., at operation 245). Supply data may be reevaluated to determine if a matching supply has been found from the external suppliers. A notice may be transmitted to the user device from which the demand was detected (e.g., at operation 250) including an identification of the supply or indicating that a supply has not been found. The process then ends for that demand (e.g., at end 255).

Figure 3:
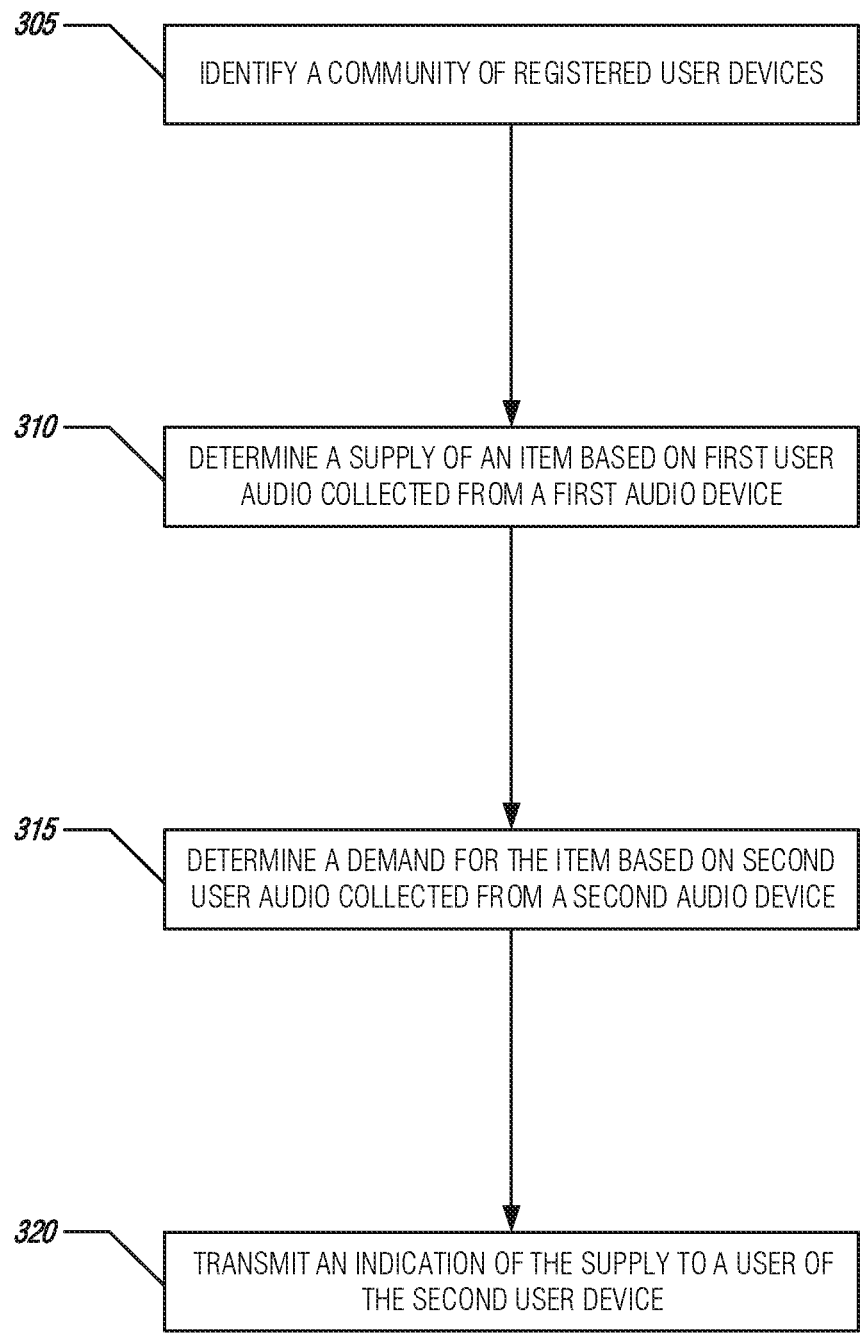
FIG. 3 illustrates an example of a method for voice enabled assistant for community demand fulfillment, according to an embodiment.

FIG. 3 illustrates an example of a method 300 for voice enabled assistant for community demand fulfillment, according to an embodiment. FIG. 3 may provide features as described in FIGS. 1 and 2.

A community of user device may be identified (e.g., by the community generator 125 as described in FIG. 1) that are registered with a voice-based supply and demand matching service (e.g., at operation 305). In an example, the community may be based on proximity of respective of the user devices. In another example, the community may be based on a shared interest of users of the user devices. In yet another example, the community is based on an attribute of a user profile of respective users of the respective user devices.

A supply of an item may be determined (e.g., by the supply detector 135 as described in FIG. 1) based on first user audio collected from a first user device of the community of devices (e.g., at operation 310). In an example, the determination of the supply of the item based on the first user audio collected from the first user device may include evaluating the first user audio using a machine learning processor. In an example, the first user audio may be evaluated (e.g., by the audio monitor 130 as described in FIG. 1) using a natural language processor.

A demand for the item may be determined (e.g., by the demand detector 140 as described in FIG. 1) based on second user audio collected from a second user device of the community of devices (e.g., at operation 315). In an example, the determination of the demand for the item based on the second user audio collected from the second user device may include evaluation of the second user audio using a machine learning processor (e.g., by machine learning processor 160 as described in FIG. 1). In an example, the second user audio may be evaluated (e.g., by the audio monitor 130 as described in FIG. 1) using a natural language processor.

An indication of the supply may be transmitted (e.g., by the output generator 155 as described in FIG. 1) to a user of the second user device (e.g., at operation 320). In an example, the supply may be calculated (e.g., by the comparator 150 as described in FIG. 1) as insufficient to meet the demand and a source may be identified (e.g., by the query engine 165 as described in FIG. 1) for a deficit supply. The source may transmitted (e.g., by the output generator 155 as described in FIG. 1) along with the indication of the supply to the user of the second user device. In another example, it may be calculated (e.g., by the comparator 150 as described in FIG. 1) that the supply is insufficient to meet the demand and the community of user devices may be expanded (e.g., by the community generator 125 as described in FIG. 1). An additional supply of the item may be determined based on audio collected from a user device of the expanded community and an indication of the additional supply may be transmitted (e.g., by the output generator 155 as described in FIG. 1) along with the indication of the supply to the user of the second user device. In yet another example, it may be calculated (e.g., by the comparator 150 as described in FIG. 1) that the supply is insufficient to meet the demand and an additional supply may be determined based on audio collected from a third device of the community of user devices. An indication of the additional supply may be transmitted (e.g., by the output generator 155 as described in FIG. 1) along with the indication of the supply to the user of the second user device.

In an example, it may be identified that the user consumed the supply and a dataset may be collected including attributes of the determined supply and demand. The dataset may be labeled based on the determined supply and demand and a machine learning processor may be trained using the labeled dataset.

In an example, consumption of the supply of the item by the user may be tracked and a usage trend may be identified using the tracked consumption. An indication may be transmitted to the user indicating that the user should become a supplier of the item based on the usage trend.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO); multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for facilitating voice-based resource matching, the system comprising:
   at least one processor; and
   memory including instructions that, when executed by the at least one processor, cause the at least one processor to perform operations to:
      obtain, by a voice recognition unit of a voice-enabled assistant, audio data collected from a community of user devices registered with a voice-based resource matching service;
      evaluate the audio data using a machine learning processor trained to determine usage statistics for the community;
      generate a predicted supply demand of a resource within the community based on usage statistics determined for the community using the audio data;
      determine supply sources for the resource to accommodate the predicted supply demand based on an evaluation of user audio collected from a microphone of the voice-enabled assistant of a user device of the community of user devices by the voice recognition unit;
      generate a search query that includes a supply quantity of the resource upon detection of a request for the resource in the audio data;
      execute the search query against a community resource database that includes an indication of the supply sources for the resource to identify a supply source for the resource from the supply sources; and
      transmit an indication of the supply source to a user of the user device.

2. The system of claim 1, wherein the community is based on proximity of the community of user devices.

3. The system of claim 1, wherein the community is based on a shared interest of users of the user devices.

4. The system of claim 1, wherein the community is based on an attribute of a user profile of respective users of the community of user devices.

5. The system of claim 1, further comprising instructions to:
   calculate that a quantity of the resource at the supply sources is insufficient to fulfill the supply quantity; and
   determine a secondary supply of the resource based on audio collected from a third user device of the community of user devices, wherein the instructions to transmit the indication of the supply source include instructions to transmit an indication of a source of the secondary supply.

6. The system of claim 1, wherein the audio data collected from the community of user devices and the user audio collected from a microphone is evaluated using a natural language processor.

7. The system of claim 1, further comprising instructions to:
identify that the user consumed the supply quantity;
collect a dataset including attributes of the supply sources and the predicted supply demand;
label the dataset based on the supply sources and the predicted supply demand; and
train the machine learning processor using the labeled dataset to refine the generation of the predicted supply demand.

8. At least one non-transitory machine-readable medium including instructions for facilitating voice-based resource matching that, when executed by at least one processor, cause the at least one processor to perform operations to:
obtain, by a voice recognition unit of a voice-enabled assistant, audio data collected from a community of user devices registered with a voice-based resource matching service;
evaluate the audio data using a machine learning processor trained to determine usage statistics for the community;
generate a predicted supply demand of a resource within the community based on usage statistics determined for the community using the audio data;
determine supply sources for the resource to accommodate the predicted supply demand based on an evaluation of user audio collected from a microphone of the voice-enabled assistant of a user device of the community of user devices by the voice recognition unit;
generate a search query that includes a supply quantity of the resource upon detection of a request for the resource in the audio data;
execute the search query against a community resource database that includes an indication of the supply sources for the resource to identify a supply source for the resource from the supply sources; and
transmit an indication of the supply source a user of the user device.

9. The at least one non-transitory machine-readable medium of claim 8, wherein the community is based on proximity of the community of user devices.

10. The at least one non-transitory machine-readable medium of claim 8, wherein the community is based on a shared interest of users of the user devices.

11. The at least one non-transitory machine-readable medium of claim 8, wherein the community is based on an attribute of a user profile of respective users of the community of user devices.

12. The at least one non-transitory machine-readable medium of claim 8, further comprising instructions to:
calculate that a quantity of the resource at the supply sources is insufficient to fulfill the supply quantity; and
determine a secondary supply of the resource based on audio collected from a third user device of the community of user devices, wherein the instructions to transmit the indication of the supply source include instructions to transmit an indication of a source of the secondary supply.

13. The at least one non-transitory machine-readable medium of claim 8, wherein the audio data collected from the community of user devices and the user audio collected from a microphone is evaluated using a natural language processor.

14. The at least one non-transitory machine-readable medium of claim 8, further comprising instructions to:
identify that the user consumed the supply quantity;
collect a dataset including attributes of the supply sources and the predicted supply demand;
label the dataset based on the predicted supply and demand; and
train the machine learning processor using the labeled dataset to refine the generation of the predicted supply demand.

15. A method for facilitating voice-based resource matching comprising:
obtaining, by a voice recognition unit of a voice-enabled assistant, audio data collected from a community of user devices registered with a voice-based resource matching service;
evaluate the audio data using a machine learning processor trained to determine usage statistics for the community;
generate a predicted supply demand of a resource within the community based on usage statistics determined for the community using the audio data;
determining supply sources for the resource to accommodate the predicted supply demand based on an evaluation of user audio collected from a microphone of the voice-enabled assistant of a user device of the community of user devices by the voice recognition unit;
generating a search query that includes a supply quantity of the resource upon detection of a request for the resource in the audio data;
executing the search query against a community resource database that includes an indication of the supply sources for the resource to identify a supply source for the resource from the supply sources; and
transmitting an indication of the supply source to a user of the user device.

16. The method of claim 15, wherein the community is based on proximity of the community of user devices.

17. The method of claim 15, wherein the community is based on a shared interest of users of the user devices.

18. The method of claim 15, wherein the community is based on an attribute of a user profile of respective users of the community of user devices.

19. The method of claim 15, further comprising:
calculating that a quantity of the resource at the supply sources is insufficient fulfill the supply quantity; and
determining a secondary supply of the resource based on audio collected from a third user device of the community of user devices, wherein transmitting the indication of the supply source includes transmitting an indication of a source of the secondary supply.

20. The method of claim 15, wherein the audio data collected from the community of user devices and the user audio collected from a microphone is evaluated using a natural language processor.

* * * * *